Patented Sept. 26, 1933

1,927,858

UNITED STATES PATENT OFFICE 1,927,858

URETHANE DERIVATIVES AND A PROCESS FOR THEIR PRODUCTION

Heinrich Ulrich and Paul Koerding, Ludwigshafen-on-the-Rhine, Germany, assignors to I. G. Farbenindustrie Aktiengesellschaft, Frankfort-on-the-Main, Germany No Drawing. Application December 22, 1931, Serial No. 582,650, and in Germany December 27, 1930

3 Claims. (Cl. 260—106)

The present invention relates to urethane derivatives and a process for their production.

It is already known that urethanes may be prepared by the action of ammonia on carbonic or chlorocarbonic acid esters, whereby in the former case alcohols and in the latter case hydrogen chloride are split off. If amines be employed instead of ammonia, urethane derivatives are obtained, as for example N-ethyl urethane from ethylamine and chlorocarbonic acid esters.

We have now found that valuable urethane derivatives are obtained by acting with carbonic esters corresponding to the general formula X.COOR, in which X is a chlorine atom or —OR$_1$ and in which R and R$_1$ are the radicles of any mono- or poly-hydric alcohols i. e. with chlorocarbonic esters or neutral carbonic esters, on any hydroxy-alkyl amines containing a reactive hydrogen atom fixed to the nitrogen atom, i. e. on any primary or secondary hydroxy-alkyl amine containing one or more hydroxyl groups. As examples of suitable carbonic esters may be mentioned the chlorocarbonic and neutral carbonic esters of ethyl alcohol, amyl alcohols, isopropyl alcohol, lauryl alcohol, octodecyl alcohol, benzyl alcohol, cyclohexanol, phenyl methylcarbinol, cinnamic alcohol, ethylene glycol and octodecandiol. As suitable amines may be mentioned for example N-ethanol-aniline or toluidine, mono- or di-ethanol- or propanol amines, mono- or di-butanol amines, cyclohexyl monoethanol amine (obtainable by acting at about 20° C. with a molecular proportion of ethylene oxide on 2 molecular proportions of cyclohexyl amine dissolved in water and fractional distillation), beta-ethyl-hexyl mono-ethanol amine or alpha-amino - beta - gamma - dihydroxypropane. Contrary to expectation, the hydroxyl groups of the said amines remain unchanged in spite of their great reactivity.

The conversion may be carried out for example by causing equimolecular proportions of hydroxy-alkyl amine and aqueous caustic alkali to act on chlorocarbonic acid esters. The caustic alkali may also be partly or wholly replaced by a corresponding excess of hydroxy-alkyl amine. Inert organic solvents, i. e. solvents free from hydroxy and amino groups, as for example carbon tetrachloride, ethylene chloride, benzene or chloroform, may be present during the reaction. They prevent a too turbulent course of the reaction.

The conversion is usually carried out at temperatures between zero and about 150° C., in the case of chlorocarbonic esters of the higher alcohols containing more than 10 carbon atoms, such as lauryl alcohol, it is advantageous to employ higher temperatures within the said range, as for example 70° C., since the speed of reaction is thus accelerated.

When employing neutral carbonic esters, as for example diethyl carbonate, simple heating of the reaction components to temperatures somewhat above the boiling point of the alcohol of the ester is sufficient to effect the formation of the hydroxy-alkyl urethanes while splitting off one alcohol group, a temperature of about 100° C. being usually sufficient on working with diethyl carbonate. The second ester group of the carbonic acid ester is not converted even with an excess of amine because, as is well known, the urethanes are very resistant compounds.

The urethane derivatives obtainable according to the method hereinbefore described correspond to the general formula:

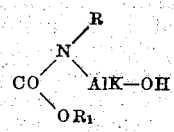

In which R is a hydrogen atom or any hydrocarbon radicle which may also contain one or more hydroxyl groups, R$_1$ any hydrocarbon radicle which may also contain one or more hydroxyl groups and Alk—OH is a hydroxylated alkyl group.

The urethane derivatives thus prepared are suitable for example as solvents, for pharmaceutical purposes, as intermediate products for the preparation of dyestuffs and as the starting materials for further syntheses. They may be converted for example into other alcohols by adding on alkylene oxides by the usual methods. Thus for example by adding one molecule of ethylene oxide on to one molecule of an N-hydroxyethyl urethane, the corresponding ether alcohol having the formula HO.C$_2$H$_4$.O.C$_2$H$_4$.NH.COOR is obtained.

The following examples will further illustrate the nature of this invention but the invention is not restricted to these examples. The parts are by weight.

Example 1

130 parts of mono-ethanol amine are mixed with 80 parts of caustic soda dissolved in 80 parts of water, and then 275 parts of the chlorocarbonic acid ester of amyl alcohol (obtainable by introducing phosgene at about 30° C. into amyl alcohol) are added gradually at a temperature of about 30° C. After adding 200 parts of ethyl alcohol, the common salt which separates out is filtered off, the filtrate neutralized with hydrochloric acid and distilled in vacuo. A good yield of the N-hydroxyethyl urethane of amyl alcohol passes over at from 165° to 175° C. under a pressure of 12 millimetres (mercury gauge) and is obtained as a water-white liquid.

Example 2

250 parts of the chlorocarbonic acid ester of isopropyl alcohol are added a little at a time at zero centigrade to 260 parts of mono-ethanol amine. When the reaction is completed, the reaction mixture is warmed to 30° C. for 1 hour and the ethanolamine hydrochloride formed during the conversion is separated by the addition of ethyl alcohol and filtered off. By vacuum distillation of the filtrate, about 220 parts of the N-hydroxyethyl urethane of isopropyl alcohol which boils at from 155° to 162° C. at 12 millimetres pressure (mercury gauge) are obtained.

Example 3

165 parts of the chlorocarbonic acid ester of octodecyl alcohol (obtainable by introducing phosgene at about 60° C. into octodecyl alcohol) are allowed to flow into a mixture of 45 parts of monobutanol amine and 57 parts of 35 per cent caustic soda solution while the temperature is kept at about 50° C. After adding 250 parts of ethyl alcohol, the whole is heated for an hour at 80° C. and the common salt which separates out is filtered off. The N-hydroxybutyl urethane of octodecyl alcohol formed is precipitated by the addition of water. It is dried in vacuo and constitutes a white powder.

Example 4

340 parts of diethyl carbonate are heated to about 100° C. with 200 parts of monoethanol amine so that the ethyl alcohol which is split off may distil off. When alcohol no longer passes over, the residue is distilled in vacuo. In addition to a small amount of unchanged initial material, a yield of about 75 per cent (with reference to the diethyl carbonate) of N-hydroxyethyl urethane of ethyl alcohol is obtained. This is a colourless liquid readily soluble in water and alcohol and boiling between 140° and 150° C. at 12 millimetres pressure (mercury gauge).

Example 5

150 parts of diethanol amine are mixed with 106 parts of 50 per cent caustic soda solution and then 180 parts of the chlorocarbonic acid ester of amyl alcohol are gradually added. The temperature is not allowed to exceed 35° C. After the reaction has continued for several hours, the N-dihydroxyethyl urethane of amyl alcohol formed may be extracted with ether after the addition of water. It boils between 210° and 215° C. at 10 millimetres pressure (mercury gauge).

Example 6

340 parts of the chlorocarbonic ester of benzyl alcohol are slowly introduced, while cooling to about 15° C., into 240 parts of mono-ethanol-amine. After the whole has been introduced, the reaction mixture is warmed to 50° C. for 1 hour and 500 parts of water are then added. The oil separating out is then separated and washed with water after dilution with ethyl ether. After drying the ethereal solution with Glauber's salt the solution is filtered off, freed from ether and distilled in vacuo. At 15 millimetres mercury gauge and 215° C. the urethane

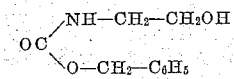

is obtained in a yield of 80 per cent of the theoretical yield calculated on the chlorocarbonic ester employed.

What we claim is:—

1. Urethane derivatives corresponding to the general formula

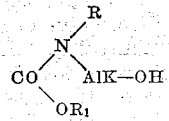

in which R is a hydrogen atom or a hydrocarbon radicle which may contain one or more hydroxyl groups, $R_1$ an aliphatic hydrocarbon radicle containing at least 5 carbon atoms and which may contain one or more hydroxyl groups, and Alk—OH a hydroxylated alkyl group.

2. The N-hydroxyethyl urethane of amyl alcohol.

3. The N-hydroxybutyl urethane of octodecyl alcohol.

HEINRICH ULRICH.
PAUL KOERDING.